Patented Nov. 26, 1935

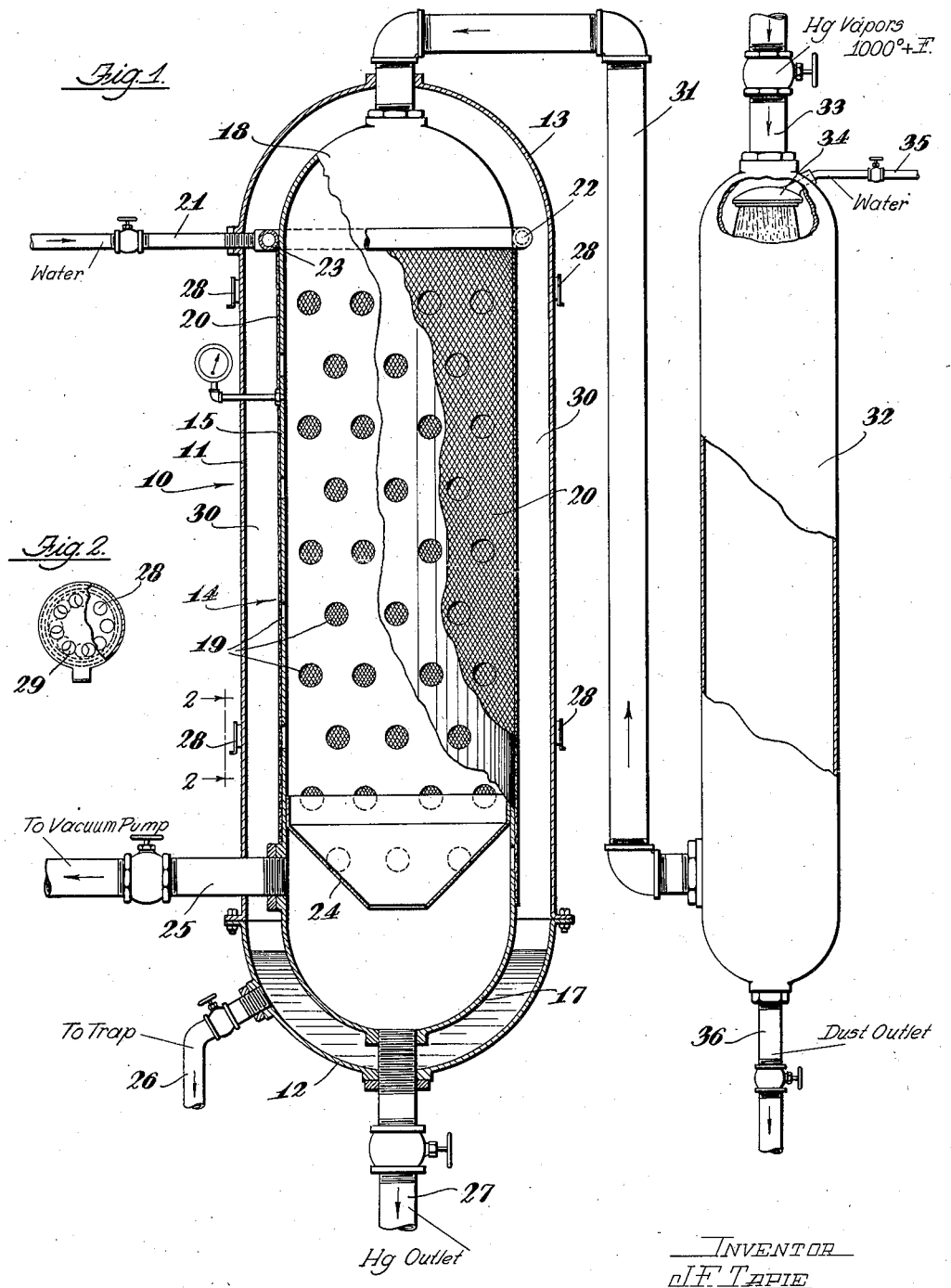

2,021,903

UNITED STATES PATENT OFFICE 2,021,903

MERCURY CONDENSER

Joseph F. Tapie, Santa Barbara, Calif.

Application September 27, 1933, Serial No. 691,137

5 Claims. (Cl. 266—1)

My invention relates to a mercury condenser.

In the recovery of mercury from cinnabar ores the hot gases from the roasters are passed through condensing chambers built of brick work and in which the mercury vapors are condensed and recovered as metallic mercury. The condensers now in general use are low in efficiency and losses through improper condensation are considerable, especially in plants where rotary furnaces are employed, and the vapors contacting the outside air condense immediately and deposit a part of the metal.

It is the object of this invention to provide a condenser in which practically all the mercury is recovered from hot gases and vapors coming from the roasting furnace. In particular, the condenser includes a condensation chamber in which the vapors are quickly cooled by a constant film of water supplied to the exterior walls of the condensing chamber and a partial vacuum is also produced therein by means of a suction fan or pump. Means are provided for separate outlets of condensed mercury and water, the process being continuous. Preferably, a dust precipitator is interposed between the condensing chamber and the roasting furnace to separate the dust from the hot gases and vapors prior to their introduction to the condenser.

With the above and other objects in view, which will appear as the description proceeds, my invention consists in the construction, combination, and arrangement of parts hereinafter described and claimed.

A preferred embodiment of my invention is illustrated, by way of example, in the accompanying drawing, in which:

Fig. 1 is an elevation partly in section of an apparatus for condensing mercury.

Fig. 2 is a front elevational detailed view of an air inlet port looking in the direction indicated by the arrows 2—2 of Fig. 1.

Referring to the drawing, the mercury condenser is indicated as a unit by the numeral 10. It comprises an outer cylindrical shell 11 with a semi-spherical bottom and top 12 and 13. Concentrically arranged in the outer shell and preferably equally spaced therefrom on all sides is an inner shell 14 comprising a cylindrical section 15, a semi-spherical bottom 17 and semi-spherical top 18. The cylindrical section 15 of the inner shell 14 is provided throughout its length with a series of spaced openings 19 preferably circular and the size of which may be from one-half to two inches in diameter depending upon the size of the inner shell.

A metal screen 20, having 60 to 100 mesh covers the entire outer surface of the cylindrical section 15. Water through a valve-controlled pipe 21 passing through the outer shell 11 and terminating in a round nozzle 22 provided with perforations 23 encircles the extreme upper end of the cylindrical section 15 of the inner shell to supply water to the screen 20. Near the lower end of the cylindrical section 15 I preferably provide a baffle plate 24 in the shape of an inverted, truncated cone.

A pipe 25 leads from the inner shell 14 at a point adjacent the baffle plate 24, and passing through the outer shell 11 communicates with a vacuum pump or blower not shown. A condensed water outlet pipe 26 leads from the lower end of the outer shell 11 to a trap, not shown, to conduct the waste water collected in the lower part of the condenser. 27 is a valve-controlled outlet pipe for the condensed mercury leading from the lower end of the inner shell 14. Cylindrical shell 11 is provided with a plurality of spaced air inlet ports 28 provided with a suitable rotating valve 29 to control the admission of air to the annular space 30 formed between the inner and outer shells. Leading from the top of the inner shell 14 and passing through the outer shell 11 is a conduit 31 communicating with the lower end of a dust precipitator 32, which is preferably in the shape of a closed cylindrical shell, into which the gases and vapors coming from the roasting furnace are introduced by a valve-controlled inlet 33. 34 is a nozzle supplied by a valve-controlled pipe 35 with water. 36 is a valve-controlled dust outlet leading from the bottom of the dust precipitator 32.

Operation

The hot gases and vapors from the roasting furnace mixed with dust in suspension and of a temperature of over 1000° F. enter the top of the dust precipitator 32 through the inlet 33. The gases and vapors so entering contain mercury in the state of vapor, sulphurous acid gas, products of combustion, besides dust and other impurities in the shape of gases and vapors.

In the dust precipitator 32 the gases and vapors come in contact with sprayed water at ordinary temperatures from the nozzle 34. The water is supplied in such quantities only that it is instantly converted into steam, thereby lowering the temperature of the mixture of gases and vapors and at the same time causing a precipitation of the dust which collects at the bottom of the dust precipitator and is removed therefrom through the outlet 36. The gases and vapors pass from the dust precipitator 32 into the upper part of the condensing chamber formed by the inner shell 14. The temperature of the mixture of gases and vapors entering the condensing chamber 14 is still above the condensation point of mercury and may be 635° F. or above. A partial vacuum, say of one-half atmosphere, is maintained within the condensing chamber by means of a vacuum pump or blower communicating therewith through the pipe 25. Water is caused to flow down on the exterior of the cylindrical section 15 of the inner shell 14 from the sprinkler 22 which supplies water to the screen 20. As the water passes in the form of a thin film on the screen covered openings 19, the vacuum within the shell 14 will cause air from the annular chamber 30 to pass through the screen; the water carried in with the air currents passing through the openings 19 will be vaporized by the heat of the mixture of the hot gases and vapors, thereby cooling the same below the boiling point of mercury so that the mercury vapors will be condensed and minute globules of mercury will settle on the bottom 17 of the inner shell, whence they are removed through the outlet 27. Air is supplied to the annular chamber 30 by the air ports 28 and the amount of air is controlled by the valves 29. Steam, vapor and gases are constantly removed through pipe 25 leading to the vacuum pump, while the excess water flowing down on the screen 20 collects on the bottom 12 of the outer shell, whence it is removed through the waste water pipe 26.

It will thus be seen that by means of a single condensing chamber the mercury vapors are quickly and efficiently cooled to a temperature below the boiling point of mercury and thus precipitated on the bottom thereof by means of a film of water cooling the walls of the condensing chamber and by the vaporization of a portion of said water which enters the condensing chamber.

The condenser has been especially designed for the recovery of mercury but it will be understood that it is of general application and may be used for the condensation of other vapors within the temperature ranges available by the cooling effect of water and water evaporation.

Various changes may be made in the construction and arrangement of parts by those skilled in the art without departing from the spirit of my invention as claimed.

I claim:

1. A mercury condenser comprising an inner chamber provided with a plurality of spaced ports in its side walls, a mercury vapor inlet at the top, and a condensed mercury outlet at the bottom of the chamber, an outer shell surrounding and spaced from the chamber and provided with valve-controlled air ports, a metal screen covering the side wall of the inner chamber, means to supply water to the metal screen, a waste water outlet leading from the outer shell, and means to create a partial vacuum within the chamber.

2. A mercury condenser comprising an inner, cylindrical, vertical shell closed at the top and bottom, an outer shell surrounding and spaced from the inner shell and provided with valve-controlled air inlet ports, a mercury vapor inlet at the top of the inner shell, a condensed mercury outlet at the bottom of the inner shell, the side walls of the inner shell being provided with a plurality of spaced openings, a metal screen covering the side wall of the shell, a circular nozzle supplying water to the top of the screen, and means communicating with the interior of the inner shell to create a partial vacuum therein.

3. A mercury condenser comprising a dust collector having a vapor inlet at the top and a dust outlet at the bottom, a water nozzle in the top of the dust collector, a condensing chamber having a mercury vapor inlet at the top communicating with the lower part of the dust collector, a condensed mercury outlet at the bottom of the condensing chamber, a baffle plate at the lower part of the condensing chamber, said condensing chamber being provided with a series of spaced openings in the side walls thereof, a metal screen covering the side walls of the condensing chamber, a circular nozzle supplying water to the top of the metal screen, and means communicating with the interior of the condensing chamber to create a partial vacuum therein.

4. A mercury condenser comprising a dust collector having a vapor inlet at the top and a dust outlet at the bottom, a water nozzle in the top of the dust collector, a condensing chamber having a mercury vapor inlet at the top communicating with the lower part of the dust collector, a condensed mercury outlet at the bottom of the condensing chamber, a baffle plate at the lower part of the condensing chamber, said condensing chamber being provided with a series of spaced openings in the side walls thereof, a metal screen covering the side walls of the condensing chamber, a circular nozzle supplying water to the top of the metal screen, means communicating with the interior of the condensing chamber to create a partial vacuum therein, and an outer shell surrounding and spaced from the condensing chamber and provided with valve-controlled air inlet ports.

5. A vapor condenser comprising an inner, cylindrical vapor condensing chamber provided at the top with a vapor inlet and at the bottom with a condensed vapor outlet, the side walls of the chamber being provided with a plurality of openings, a metal screen covering said openings, means to supply a film of water to the metal screen, and means communicating with the chamber to create a partial vacuum therein.

JOSEPH F. TAPIE.